United States Patent

Gold et al.

[11] Patent Number: 6,058,494
[45] Date of Patent: May 2, 2000

[54] STORAGE SYSTEM WITH PROCEDURE FOR MONITORING LOW LEVEL STATUS CODES, DERIVING HIGH LEVEL STATUS CODES BASED THEREON AND TAKING APPROPRIATE REMEDIAL ACTIONS

[75] Inventors: Stephen Gold; Jonathan Conrad Lord; Philip John Turner, all of Bristol, United Kingdom

[73] Assignee: Hewlett-Packard Company, Palo Alto, Calif.

[21] Appl. No.: 08/887,917

[22] Filed: Jul. 3, 1997

[30] Foreign Application Priority Data

Jul. 23, 1996 [EP] European Pat. Off. .............. 96305391

[51] Int. Cl.[7] .................................................. G06F 11/00
[52] U.S. Cl. .............................................................. 714/42
[58] Field of Search ........................ 395/183.18, 183.01, 395/185.01; 364/265, 266.5, 267.1, 267.4; 714/42, 25, 48, 704; 711/4, 111

[56] References Cited

U.S. PATENT DOCUMENTS

| | | | |
|---|---|---|---|
| 4,549,295 | 10/1985 | Purvis ........................................ 371/13 |
| 5,287,478 | 2/1994 | Johnston et al. ......................... 395/425 |
| 5,361,346 | 11/1994 | Panesar et al. ..................... 395/183.18 |
| 5,406,425 | 4/1995 | Johnston et al. ........................... 360/48 |
| 5,412,666 | 5/1995 | Squires et al. .......................... 371/37.4 |
| 5,444,859 | 8/1995 | Baker et al. .............................. 395/575 |
| 5,450,579 | 9/1995 | Johnson .................... 395/650 |
| 5,450,609 | 9/1995 | Schultz et al. ........................... 395/800 |
| 5,500,940 | 3/1996 | Skeie ................................... 395/183.01 |
| 5,568,606 | 10/1996 | Dobbek .............................. 395/182.06 |
| 5,615,335 | 3/1997 | Onffroy et al. ..................... 395/183.06 |
| 5,617,535 | 4/1997 | Aizawa et al. ...................... 395/183.22 |
| 5,684,945 | 11/1997 | Chen et al. ......................... 395/182.18 |
| 5,717,850 | 2/1998 | Apperley et al. .................. 395/182.04 |
| 5,761,411 | 6/1998 | Teague et al. ...................... 395/184.01 |
| 5,815,650 | 9/1998 | Apperley et al. .................. 395/182.04 |
| 5,828,583 | 10/1998 | Bush et al. .......................... 364/551.01 |
| 5,832,199 | 11/1998 | Apperley et al. .................. 395/182.04 |
| 5,832,204 | 11/1998 | Apperley et al. .................. 395/183.18 |
| 5,835,700 | 11/1998 | Carbonneau et al. ............... 395/183.2 |
| 5,835,703 | 11/1998 | Konno ................................. 395/183.18 |

OTHER PUBLICATIONS

Webster's II New Riverside University Dictionary, definition of the word "translates", p. 1227, Dec. 1988.

IBM TDB, vol. 37, No. 02B, Feb. 1994, p. 241, "Keeping Users Aware of the Status of an Object Affected by Multiple Program".

IBM TDB, vol. 37, No. 06B, Jun. 1994, pp. 499–501, Operator Intervention Message Management for Tape Drive Displays.

European Search Report; EP 96305391.

*Primary Examiner*—Robert W. Beausoliel, Jr.
*Assistant Examiner*—Stephen C. Elmore

[57] ABSTRACT

A controller of a storage system for computer data enables diagnosis of errors and status monitoring of the storage system. The controller is enabled to categorize errors according to severity and to analyze low-level errors so as to trigger a combination of high level error conditions.

11 Claims, 2 Drawing Sheets

STORAGE SYSTEM WITH PROCEDURE FOR MONITORING LOW LEVEL STATUS CODES, DERIVING HIGH LEVEL STATUS CODES BASED THEREON AND TAKING APPROPRIATE REMEDIAL ACTIONS

TECHNICAL FIELD

The present invention relates to devices for storing computer data and relates particularly to diagnostics and status monitoring.

BACKGROUND ART

It is known to provide status monitoring in a disc drive and U.S. Pat. No. 5,450,609 describes one such system in which an array of disc drives includes a facility for status monitoring and for warning the user of a problem. The warning facility described is not very different in scope from the known facility on existing tape drives of a warning light indicating failure of a backup operation.

DISCLOSURE OF INVENTION

The present invention aims to provide a status monitoring and diagnostic facility for a storage device which takes account of the fact that the storage medium is removable and which diagnoses a wider range of error conditions than simply flagging imminent failure.

According to the present invention we provide a system for storing computer data comprising:

a storage device having means for reading data from and writing data to removable media;
 and a controller,
 wherein the storage device comprises:
 means to perform error diagnosis and to translate low-level error indicators into high level error conditions and wherein the high level error conditions are categorised according to severity;
 means to communicate occurrence of these high level error conditions to the controller to trigger the provision of error messages to the user.

Embodiments of the present invention provide a facility to inform the user of errors occurring during a backup operation and to group errors into categories according to severity. This enables the provision of messages to the user which are primarily for information as well as messages to indicate more serious error conditions. This feature also enables the user to prioritise error recovery steps according the severity of the error conditions if there is more than one existing at the same time.

The term 'low-level error indicator' is intended to cover both error codes and other relevant triggers generated in the storage device. Low-level error codes cover items such as unrecoverable read and/or write errors but there are also other relevant triggers for high level error conditions such as the rate at which data is being written, data relevant to the media being used etc. Low-level error indicators are normally generated by the firmware in the storage device.

In the embodiment to be described, the storage device is a tape drive, but the invention applies also to other storage devices with removable media eg. optical disc drives.

The controller may be backup controller software running on a host computer. Alternatively the system may be part of network in which the controller is backup software running on a backup server on the network. However, the invention is not limited to these alternatives and the controller may be implemented in software and/or hardware and may be in a general purpose computer or a dedicated device, whether standalone or connected to a network.

In the embodiment to be described, the high level error conditions are categorised into three classes according to severity. The classes are: Information, Warning and Critical.

If there is a plurality of error conditions occurring at the same time, error messages may be ordered according to the relative severity of the pertaining error conditions. This feature may help the user in prioritising the necessary error recovery steps.

The low-level error indicators may be grouped into functional types and the high level error conditions may be communicated according to what functional type of low-level error has occurred. This feature may facilitate specifying the relationship between low-level error indicators and the high level error conditions, which task would normally be carried out by the storage device manufacturer.

Preferably the system comprises means to automatically initiate a predetermined sequence of error recovery steps according to the type of high level error conditions identified. In this way there may be provision for automatically triggering specific error recovery steps without manual intervention of the user.

In the embodiment to be described, the error status information is stored in the storage device in a standardised format. In this way, the invention provides a technique whereby the way in which errors are detected and categorised for a particular storage device is device-specific and can be decided by the device manufacturer but within the context of a standardised scheme which enables all devices complying with the standardised format to provide the user with consistent error indications.

There are different ways in which the controller may receive error information from the storage device. In one embodiment, the system is configured so that the occurrence of high level error conditions is communicated to the controller at predetermined points in a storage operation. In another embodiment, the system is configured so that the occurrence of high level error conditions is communicated to the controller whenever a new error is indicated by the storage device.

The system may comprise a plurality of storage devices, such as in an autoloader or a coordinated array of storage devices.

According to another aspect of the present invention we provide a system for storing computer data comprising:

a storage device having means for reading data from and writing data to removable media;
 and a controller,
 wherein the storage device comprises:
 means to perform error diagnosis and to translate low-level error indicators into high level error conditions;
 wherein selected low-level error indicators cause communication of a combination of high level error conditions;
 means to communicate occurrence of these high level error conditions to the controller to trigger the provision of error messages to the user.

In known systems for storing computer data which include a storage device communicating with one or more host devices using a SCSI link, or bus, the occurrence of a low-level error indicator triggers a single high level error message. According to the above aspect of the present invention, a combination of high level error conditions may result from selected low-level error indicators thus providing a more flexible system and allowing a more extensive set of error messages to be provided to a user.

BRIEF DESCRIPTION OF DRAWINGS

A particular embodiment of the present invention will now be described, by way of example only, with reference to.

The invention will also be described, by way of example, with reference to tables reproduced at the end of this description in which.

Table 1 shows the error conditions relating to particular flags.

Table 2 shows the format of the Log Sense page.

Table 3 shows the format of the Mode Sense page.

BEST MODE FOR CARRYING OUT THE INVENTION, & INDUSTRIAL APPLICABILITY

Figure 1:
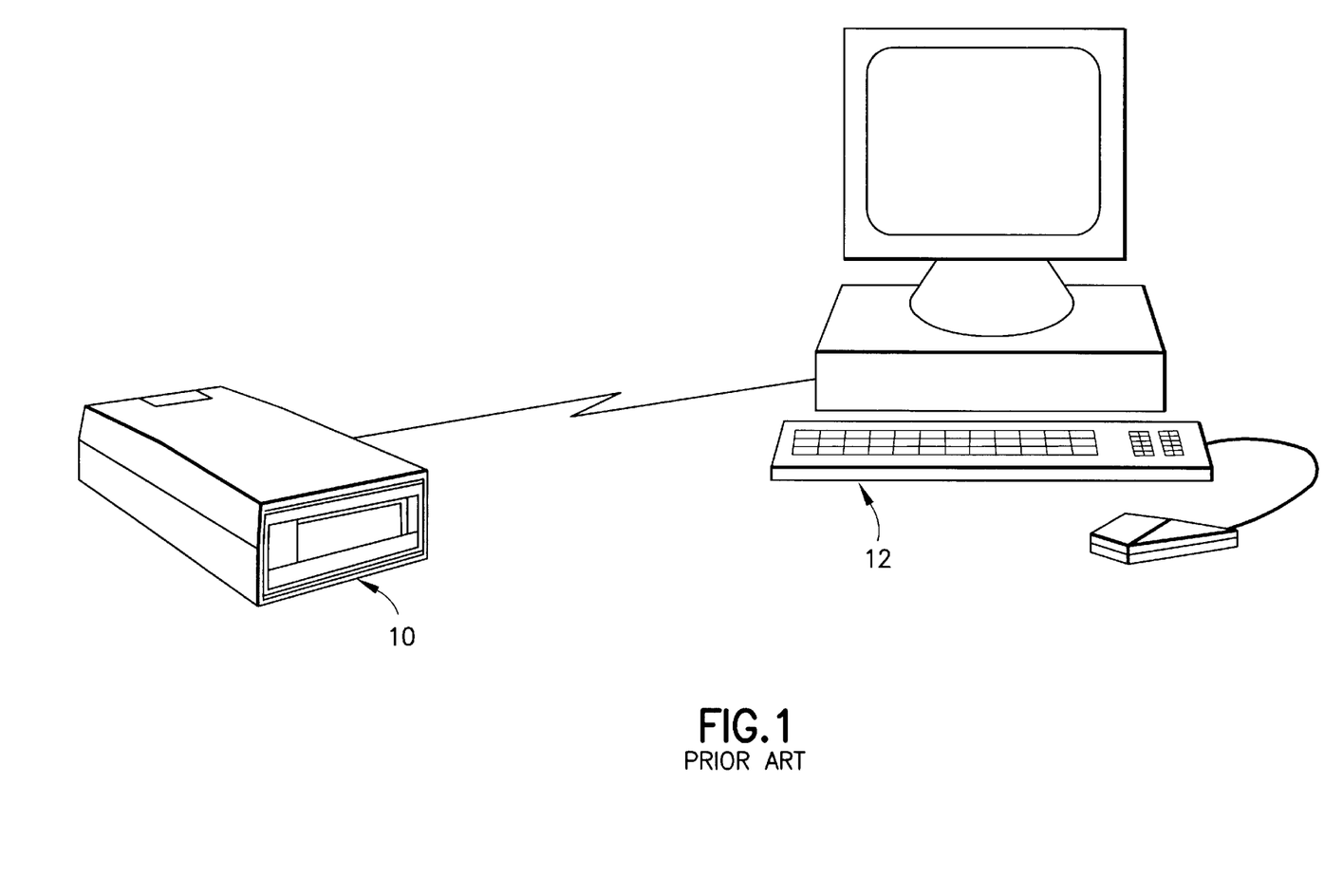
FIG. 1, which shows a tape drive connected to a host computer.

Referring to FIG. 1, a tape drive 10 is directly connected to a host computer 12. The tape drive 10 receives data to be backed up from the host computer 12 and sends saved data back to the host when requested. A standard SCSI ('Small Computer System Interface') interface is used to interconnect the tape drive 10 with the host computer 12.

Figure 2:
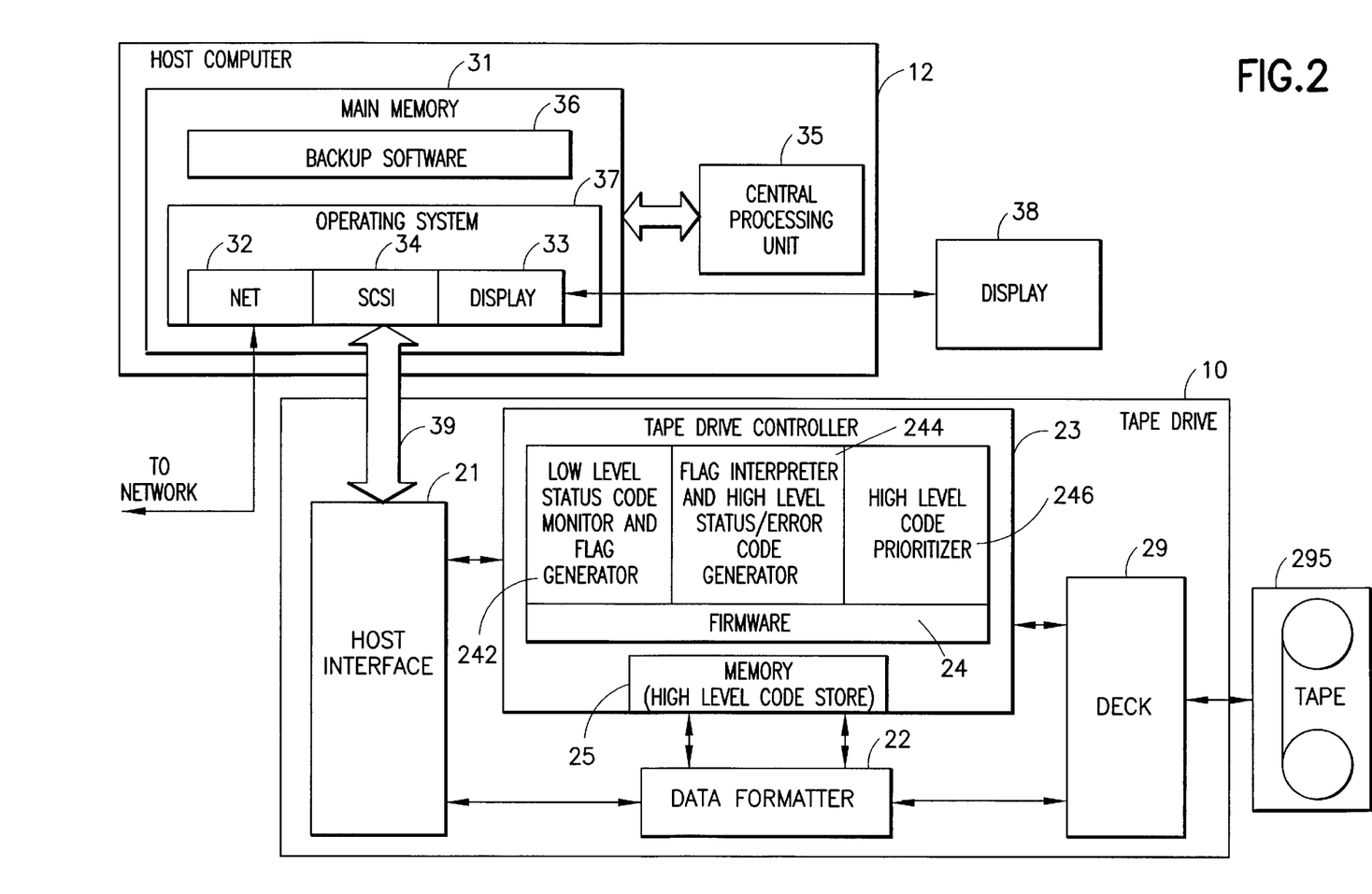
FIG. 2, which shows by way of a functional block diagram the arrangement of FIG. 1.

FIG. 2 is a functional block diagram of the system represented in FIG. 1. In FIG. 2, the tape drive 10 is arranged to store and retrieve data in accordance with the digital data storage (DDS) standard format. The tape drive 10 comprises a host interface unit 21 for interfacing the drive 10 with a host computer 12 via a standard SCSI bus 39. A data formatter 22 in the tape drive 10 processes user data records and separator marks into and out of indexed groups, compresses/decompresses data in a known fashion and effects low-level signal processing, as specified in the DDS format. The low-level processing converts streams of bytes from the groups into track signals ready for recording data to tape and reconverts track signals from tape back into byte streams for reconstructing the groups. The tape drive 10 further comprises a deck 29 of known type comprising electronic circuitry for controlling recording heads and tape operations for writing data to and reading data from a tape medium 295. The tape drive 10 also comprises a tape drive controller 23 for controlling the operation of the other elements of the drive in response to commands received from the host 12 via the host interface unit 21.

The drive 10, controlled by the tape drive controller 23, is arranged to respond to SCSI commands from backup software 36 running the host computer 12 to load/unload a tape, to store a data record or separator mark, to search for selected separator marks or records, and to read back the next record and to compress/decompress data records. These functions are standard tape drive functions and, as such, will not be considered in further detail in this description. For further, more detailed information on DDS tape drives and the respective data format, the reader is referred to European Patent Application EP459041A1.

In accordance with the present embodiment, the tape drive controller 23 incorporates further functionality, which a storage device has hitherto not provided, to support status monitoring and tape drive diagnostics capabilities. This functionality is provided by appropriate firmware processes 24 embedded in the tape drive controller 23. Of the processes: a first process 242 monitors the status of predetermined functions in the tape drive 10 by receiving low level system status codes returned by the other elements of the drive during the operation of the tape drive and, in response, sets flags to indicate possible problems; a second process 244 interprets the flags in a pre-determined manner and generates one or more predetermined high level status or error codes; and a third process 246 prioritizes the high level codes, where more than one code exists, in accordance with a pre-defined criteria and stores the results in an area of random access memory (RAM) 25 accessible by the tape drive controller 23. Once stored, the high level codes may be forwarded to the host computer 12, for example by "polling", as described below in more detail. The low level codes, the flags, the high level codes and the priority criteria are also described in detail below.

As also illustrated in FIG. 2, the host computer 12 comprises a standard computing platform running under the control of an operating system 37 such as Windows NT 4.0. Backup controller software 36, stored in main memory 31 and running on a central processing unit 35, is a software process written, for example, in the $C^{++}$ programming language. The backup software 36 is arranged to control the host computer 12 to operate in accordance with the present embodiment. The operating system 37 of the host computer 12 includes: a network driver 32 for transmitting and receiving data, for example in TCP/IP format, to and from a network (not shown); a display driver 33, such as a video graphics array (VGA) driver, to transmit display signals to a display screen 38; and a SCSI driver 34, to transfer commands and data between the host computer 12 and the tape drive 10. The drivers provided support respective standard hardware interfaces.

The backup controller software 36 is arranged to control the host computer 12 to retrieve high level status or error codes which have been stored in the memory 25 from the tape drive 10 by polling the tape drive 10 regularly. Other methods of moving the data from the tape drive 10 to the host computer 12 are described below. Further, the backup controller software 36 is arranged to process any received high level status or error codes and forward to a user appropriate, pre-defined error or action messages. Such messages may be forwarded for display to the user on the display screen 38, and/or across a network to a remote network console (not shown) as necessary.

In accordance with the present embodiment, there are 64 flags defined to cover a wide range of error conditions and these are as shown in Table 1. The column headings in Table 1 are as follows:

No.—this is simply the flag number;

Flag—this is the name of the flag and indicates the error to which it relates;

Type—this indicates the seriousness of the error:

"I"=Information: a suggestion to the user;

"W"=Warning: the user is advised to take action. Performance or data may be at risk;

"C"=Critical!: action should be taken immediately;

Required Host Message—this is the text of the message which should be relayed to the user eg. by display on the screen 38 of the host computer 12;

Cause—this indicates the cause of the error.

The flags are grouped into the following categories:

Flags 1 to 19: For tape drive write/read management

Flags 20 to 29: For cleaning management

Flags 30 to 39: For tape drive hardware errors

Flags 40 to 49: For tape autoloader errors

Flags 50 to 64: Currently unassigned for future use

The specific conditions for any one flag to be set and cleared are drive-specific and are defined by the drive manufacturer. If a drive cannot support the recognition of all the flag conditions, then unsupported flags may remain unset.

Low-level error indicators may be grouped into functional types with a set of possible low-level error indicator codes being assigned to each group. The relevant functional types include:

Unrecoverable write error codes;

Unrecoverable read error codes;

Tape management error codes;

Hardware error codes;

Recoverable write error codes;

Recoverable read error codes.

There are also other groups in addition to the above.

If such grouping is done, then flags may be set according to which type of low-level error indicator has occurred. For example, all recoverable write error codes would cause a particular flag to be set, in fact Flag 1 in Table 1 in this embodiment. This feature relieve the tape drive manufacturer of the need to define a mapping from every single low-level error indicator to a particular flag.

Furthermore, the system may be configured so that a combination of high level error conditions result from selected low-level error indicators. Thus two or more flags may be set in order to provide a plurality of relevant error messages to the user.

A well-known feature of the standard SCSI interface is the use of 'log sense' pages to record peripheral status information and 'mode sense' pages to record functional and configuration settings.

The error information contained in Table 1 is stored by the tape drive 10 in a 'Log Sense' page in memory 25. The format of the Log Sense page is shown in Table 2. Each line in the Log Sense page represents one byte of data and the entries are numbered down the lefthand side of Table 2. A description of the entries is as follows:

Entry 0—the name of the page (2e in this example);

Entry 1—reserved for future use;

Entry 2—the length of the particular page (2 bytes long);

Entry 3—the remainder of the page length;

Entry 4—the SCSI standard uses parameters and this is the name of the current parameter (2 bytes long). In this embodiment, each parameter corresponds to one of the flags in Table 1;

Entry 5—the remainder of the parameter name;

Entry 6—the parameter control byte. The fields are explained below. The terms 'sense key' and 'sense code' are commonly used in relation to the SCSI standard to refer to codes for the type of error and details of the error, respectively:

DU=Disable Update: a value of zero means that the tape drive will not update the log parameter value (Entry 8 below). A value of one means that the tape drive will not update the log parameter value except in response to a Log Select command that specifies a new value for the log parameter. The DU bit is undefined and ignored if the PC bit (part of the page code) in the Log Sense command is set to 0×00 (as in this embodiment);

DS=Disable Save: a value of zero means that the tape drive supports saving for that log parameter. A value of one means means that saveable parameters are not supported;

TSD=Tape drive Save Disable: a value of zero means that the tape drive provides a tape drive-defined method for saving log parameters. A value of one means that the tape drive does not provide a tape drive-defined method of saving log parameters;

ETC=Enable threshold comparison: a value of one means that comparison to the threshold value is performed. A value of zero means that a comparison is not performed;

TMC=Threshold Met Criteria: defines the basis for the comparison of the parameter value. Only valid if ETC= 1. If the ETC=1 and the comparison is true, a check condition will be generated. The Sense key is then set to UNIT ATTENTION and the additional sense code is set to THRESHOLD CONDITION MET;

LP=List Parameter: indicates the format of the log parameter. A value of zero means that the parameter is a data counter. A value of one means that the parameter is a list parameter, and then the ETC and TMC field must be set to zero;

Entry 7—the length of the current parameter;

Entry 8—the actual parameter. In this case it is the first flag, namely the Read Flag. In this embodiment only one bit is used for each flag;

Entry 9 and so on—corresponding entries for the subsequent parameters (flags).

There are two methods by which the host computer 12 can access error information in the tape drive 10. The first method is "polling" where the Log Sense page is read from the tape drive at the following times as a minimum:

1. Immediately after a SCSI Check Condition/Request Sense cycle. This is a standard cycle in which the drive makes an error status report and if there is an error this is indicated as a 'Check Condition'. The host then sends a 'Request Sense' command to get details of the error.

2. At the end of each tape when the backup/restore job spans multiple tapes. If the tape is to be ejected then the Log Sense page must be read before ejection.

3. At the end of a backup/restore job.

It is also recommended to poll the Log Sense page every 60 seconds while the tape drive 10 is idle.

The second access method is to use the SCSI 'Mode Select' command to enable the "Check Condition" mode, so that the tape drive 10 will report a Check Condition on the next SCSI command after one or more flags are set. If this SCSI command should return a Check Condition due to an actual error, then this will override the Check Condition 'forced' by the Mode Select command. The Log Sense page will therefore be read from the tape drive 10 after every Check Condition/Request Sense cycle (both forced check conditions and error check conditions). The Request Sense extended sense code (this is the code reported by the tape drive 10) for a check condition is 5D00, and the command that triggered this Check Condition will have been executed, thus the backup controller software 36 will not repeat the command that triggered a Check Condition.

The recommended method is "check condition" rather than "polling" since this guarantees that the backup controller software 36 will be made aware of any flag being set. With "polling" there are theoretical corner cases where flag information could be missed, though the higher the polling frequency the less chance there is of this happening.

The method of access to the tape drive 10 can be configured via the SCSI bus, based on a new Mode Sense page. The interface can be configured via the Mode Select command using the same page format to write the configuration as to read it (Mode Sense command). The format of this new Mode Sense page is as shown in Table 3.

Again each entry in the Mode Sense page is one byte long. The entries are as follows:

Entry 0—the name of the page (1C in this example);

Entry 1—the length of the particular page;

The following fields are in the remainder of the Mode Sense page:

DExcpt: When this bit is set to zero the reporting method indicated by the MRIE field is used. When this bit is set to one this indicates that the tape drive 10 will ignore the MRIE field (so that the backup controller software 36 must poll the Log Sense page). Thus to enable "check condition" mode, this bit must be set to zero.

In this embodiment, the default setting is 1, and this is configurable via Mode Select Test: When this bit is set to zero, this indicates that the tape drive 10 will not generate any false flags. When this bit is set to one, the tape drive 10 will set a false flag based on the MRIE and Interval Timer flags. Thus the next SCSI command after the Mode Select command will return Check Condition, with sense key set to UNIT ATTENTION and extended sense code set to 5DFF (a test code). If both the Test and DExcpt bits are set to one, then the Mode Select command will return Check Condition, with sense key set to Illegal Request and extended sense code set to INVALID FIELD in the Parameter List.

In this embodiment, the default setting is 0, configurable via Mode Select

Perf: When this bit is set to zero, this indicates that flag setting operations that can cause delays are acceptable. When this bit is set to one, the tape drive 10 will not cause delays while setting flags (this may cause the tape drive 10 to disable some or all of the flag setting operations).

In this embodiment, the default setting is 0, not changeable via Mode Select

LogErr: When this bit is set to zero, this indicates that the logging of flags set within a tape drive 10 is vendor specific. When this bit is set to one, the tape drive 10 will log flags set.

In this embodiment, the default setting is 0, not changeable via Mode Select

MRIE: This field indicates the method used by the tape drive 10 to report flags set. The priority of reporting flags set is tape drive 10 specific. If the access method being used is the one described above using the Mode Select command to enable the "Check Condition" mode, so that the tape drive 10 will report a Check Condition on the next SCSI command after one or more flags are set then, in the event that the SCSI command should return a Check Condition due to an actual error, then this will override the forced Check Condition. The values defined for this field are:

0x1: No reporting of flags set

0x2: Generate Unit Attention: tape drive 10 returns Check Condition on the next SCSI command after a flag is set, with the sense key set to UNIT ATTENTION and the extended sense code set to 5D00. The command that triggered the forced Check Condition will not have been executed, and thus needs to be repeated;

0x3: Conditionally generate Recovered Error: depending on the value of tape drive 10 error recovery settings, the tape drive 10 returns Check Condition on the next SCSI command after setting of a flag was detected, with the sense key set to RECOVERED ERROR and the extended sense code set to 5D00. The command that has triggered the forced Check Condition will have been executed correctly, and thus does not need to be repeated;

0x4: Unconditionally generate Recovered Error: regardless of the value of the tape drive 10 error recovery settings, the tape drive 10 returns Check Condition on the next SCSI command after setting of a flag was detected, with the sense key set to RECOVERED ERROR and the extended sense code set to 5D00. The command that has triggered the forced Check Condition will have been executed correctly, and thus does not need to be repeated;

0x5: Generate No Sense: tape drive 10 returns Check Condition on the next SCSI command after setting of a flag was detected, with the sense key set to NO SENSE and the extended sense code set to 5D00. The command that has triggered the check condition will have been executed correctly, and thus does not need to be repeated;

0x6: Only report on request: tape drive 10 will preserve the flag(s) set. The backup controller software 36 then polls the tape drive 10 using the Log Sense command.

In this embodiment, the default setting is 3, not changeable via Mode Select.

Interval Timer: When this field is set to zero, this indicates that the tape drive 10 will only set a flag once. When this field is set to non-zero, the value indicates the period in 100 millisecond increments for resetting a flag. The tape drive 10 will not set flags more frequently than the specified timer interval and will set flags as soon as possible after the timer interval has elapsed. A value of 0xFFFFFFFF in the field indicates that the timer interval is tape drive 10 specific.

In this embodiment, the default setting is 0, not changeable via Mode Select.

Report Count: When this field is set to zero, this indicates that there is no limit to the number of times the tape drive 10 will report a flag being set (assuming that Interval Timer is set to non-zero). When this field is set to non-zero, this indicates the number of times to report a flag being set.

In this embodiment, the default setting is 0, not changeable via Mode Select.

Every time the Log Sense page is read from the tape drive 10, the backup controller software 36 reads all 64 flags to discover which are set (there may be more than one). There may also be data associated with a set flag in the remainder of the flag byte, which should also be read. The flags will automatically be cleared by the tape drive 10 without action from the software, and thus any set flags read by the backup controller software 36 indicate a new event. The software therefore will not latch any flag states but will always action any set flag detected.

A particular backup controller may be connected to more than one tape drive 10. In addition, for each tape drive 10, there will be a plurality of tape cassettes used for backing up data. Each tape cassette is given a 'software label' to identify it.

For every flag that is set, the backup controller software 36 will log the error message specified in Table 1 along with details to identify which tape drive 10 the error refers to, and the software label of the media for media related actions (flags 4 and 7). The severity of the error is identified based on the flag Type field in Table 1, and when multiple flags are set simultaneously they are listed in ascending order of severity ie. Information/Warning/Critical).

For every flag that is set, the backup controller software 36 notifies the user through its normal notification methods (e.g. broadcast, email, SNMP, etc.), displaying the specified error message along with details to identify which tape drive 10 the error refers to, and the software label of the media for media related actions (flags 4 and 7). The notification identifies the severity of the error, and when multiple flags are set simultaneously they are listed in ascending order of severity (Information/ Warning/ Critical). It is possible to include error message filters in the backup controller software 36 so that only errors of a certain severity are notified to the user and/or specifying the mode of notification of errors of different severity. When multiple flags are set simultaneously, they may be associated together as a single error event, for example by displaying all of the associated error messages together in one dialogue box.

The backup controller software 36 does not fail a backup job based on the flag information. Rather, setting of the flags provides preventative maintenance information such that the user or the backup controller software 36 can initiate actions to prevent the failure occurring at all, and thus increases the reliability of the backup system. This facility also provides assistance in diagnosing/recovering a failing backup job.

The backup controller software 36 may be configured to automate the recommended maintenance/recovery actions, particularly if there are multiple tape drive 10s or autochangers present. For example, it could trigger performance of a cleaning cycle for flags 20 and 21, or a tape copy for flags 4 and 7, and retire the suspect media.

Typically, the backup controller software will be loaded into the memory of the host computer from a computer readable data carrying medium such as a floppy disk, mini-disk or optical disk (CD ROM). Alternatively, the software could be down-loaded accross a network such as the Internet from a source such as a World Wide Web or FTP server.

The above embodiment relates to a tape drive 10 but it will be understood that the present invention is relevant to any storage device which uses removable media and so is also relevant to optical disc drives.

TABLE 1

| No | Flag | Type | Required Host Message | Cause |
|---|---|---|---|---|
| 1 | Read | W | The tape drive 10 is having problems reading data. No data has been lost, but there has been a reduction in the capacity of the tape. | The drive is having severe trouble reading |
| 2 | Write | W | The tape drive 10 is having problems writing data. No data has been lost, but there has been a reduction in the capacity of the tape. | The drive is having severe trouble writing |
| 3 | Hard Error | W | The operation has stopped because an error has occurred while reading or writing data which the drive cannot correct. | The drive had a hard read or write error |
| 4 | Media | C | Your data is at risk: 1. Copy any data you require from this tape. 2. Do not use this tape again. 3. Restart the operation with a different tape. | Media performance is severely degraded |
| 5 | Read Failure | C | The tape is damaged or the drive is faulty. Call the tape supplier helpline. | The drive can no longer read data from the tape |
| 6 | Write Failure | C | The tape is from a faulty batch or the tape drive 10 is faulty: 1. Use a good tape to test the drive. 2. If the problem persists, call the tape drive 10 supplier helpline. | The drive can no longer write data to the tape |
| 7 | Media Life | W | The tape cartridge has reached the end of its useful life: 1. Copy any data you need to another tape 2. Discard the old tape. | The media has exceeded its specified life |
| 8 | Not Data Grade | W | The tape cartridge is not data-grade. Any data you back up to the tape is at risk. Replace the cartridge with a data-grade tape. | The drive has not been able to read the MRS stripes |
| 9 | Write Protect | C | You are trying to write to a write-protected cartridge. Remove the write-protection or use another tape. | Write command is attempted to a write protected tape |
| 10 | No Removal | I | You cannot eject the cartridge because the tape drive 10 is in use. Wait until the operation is complete before ejecting the cartridge. | Manual or s/w unload attempted when prevent media removal on |
| 11 | Cleaning Media | I | The tape in the drive is a cleaning cartridge. If you want to back up or restore, insert a data-grade tape. | Cleaning tape encountered during backup or restore |

TABLE 1-continued

| No | Flag | Type | Required Host Message | Cause |
|---|---|---|---|---|
| 12 | Unsupported Format | I | You have tried to load a cartridge of a type which is not supported by this drive.<br>The cartridge has been automatically ejected. | Attempted loaded of unsupported tape format, e.g. DDS2 in DDS1 drive |
| 13 | Snapped Tape | C | The operation has failed because the tape in the drive has snapped:<br>1. Discard the old tape.<br>2. Restart the operation with a different tape. | Tape snapped in the drive |
| 20 | Clean Now | C | The tape drive 10 needs cleaning:<br>1. If the operation has stopped, eject the tape and clean the drive<br>2. If the operation has not stopped, wait for it to finish and then clean the drive. | The drive thinks it has a head clog, or needs cleaning |
| 21 | Clean Periodic | W | The tape drive 10 is due for routine cleaning:<br>1. Wait for the current operation to finish.<br>2. Then use a cleaning cartridge. | The drive is ready for a periodic clean |
| 22 | Expired Cleaning Media | C | The last cleaning cartridge used in the tape drive 10 has worn out:<br>1. Discard the worn out cleaning cartridge.<br>2. Wait for the current operation to finish.<br>3. Then use a new cleaning cartridge. | The cleaning tape has expired |
| 30 | Hardware A | C | The tape drive 10 has a hardware fault:<br>1. Eject the tape or magazine.<br>2. Reset the drive (hold the unload button down for 5 seconds).<br>3. Restart the operation. | The drive has a hardware fault which is not read/write related. |
| 31 | Hardware B | C | The tape drive 10 has a hardware fault:<br>1. Turn the tape drive 10 off and then on again.<br>2. Restart the operation.<br>3. If the problem persists call the tape drive 10 supplier helpline. | The drive has a hardware fault which is not read/write related. |
| 32 | Interface | W | The tape drive 10 has a problem with the SCSI interface:<br>1. Check the cables and cable connections.<br>2. Restart the operation. | The drive has identified an interfacing fault |
| 33 | Eject Media | C | The operation has failed:<br>1. Eject the tape or magazine.<br>2. Insert the tape or magazine again.<br>3. Restart the operation. | Error recovery action |
| 34 | Download Fail | W | The firmware download has failed because you have tried to use the incorrect firmware for this tape drive 10.<br>Obtain the correct firmware and try again. | Firmware download failed |
| 40 | Loader Hardware A | C | The changer mechanism is having difficulty communicating with the tape drive 10:<br>1. Turn the autoloader off then on.<br>2. Restart the operation.<br>3. If problem persists, call the tape drive 10 supplier helpline. | Loader mech. is having trouble communicating with the tape drive 10 |
| 41 | Loader Stray Tape | C | A tape has been left in the autoloader by a previous hardware fault:<br>1. Insert an empty magazine to clear the fault.<br>2. If the fault does not clear, turn the autoloader off and then on again.<br>3. If the problem persists, call the tape drive 10 supplier helpline. | Stray tape left in loader after previous error recovery |
| 42 | Loader Hardware B | W | There is a problem with the autoloader mechanism. | Loader mech. has a hardware fault |
| 43 | Loader Door | C | The operation has failed because the autoloader door is open:<br>1. Clear any obstructions from the | Tape changer door open |

TABLE 1-continued

| No Flag | Type | Required Host Message | Cause |
|---|---|---|---|
| 64 | | autoloader door.<br>2. Eject the magazine and then insert it again.<br>3. If the fault does not clear, turn the autoloader off and then on again<br>4. If the problem persists, call the tape drive 10 supplier helpline. | |

TABLE 2

| | 7 | 6 | 5 | 4 | 3 | 2 | 1 | 0 |
|---|---|---|---|---|---|---|---|---|
| 0 | | | | Page Code 0x2e | | | | |
| 1 | | | | Reserved (0) | | | | |
| 2 | | | | Page Length | | | | |
| 3 | | | | | | | | |
| 4 | | | | Parameter Code (1) | | | | |
| 5 | | | | | | | | |
| 6 | DU(0) | DS(1) | TSD(0) | ETC(0) | TMC(0) | | Res(0) | LP(0) |
| 7 | | | | Parameter Length (1) | | | | |
| 8 | | | | Read Flag | | | | |
| 9 | | | | Parameter Code (2) | | | | |
| 10 | | | | | | | | |
| 11 | DU(0) | DS(1) | TSD(0) | ETC(0) | TMC(0) | | Res(0) | LP(0) |
| 12 | | | | Parameter Length (1) | | | | |
| 13 | | | | Write Flag | | | | |
| 14 | | | | Parameter Code (3) | | | | |
| 15 | | | | | | | | |
| 16 | DU(0) | DS(1) | TSD(0) | ETC(0) | TMC(0) | | Res(0) | LP(0) |
| 17 | | | | Parameter Length (1) | | | | |
| 18 | | | | Hard Error Flag | | | | |
| 19 | | | | Parameter Code (4) | | | | |
| 20 | | | | | | | | |
| 21 | DU(0) | DS(1) | TSD(0) | ETC(0) | TMC(0) | | Res(0) | LP(0) |
| 22 | | | | Parameter Length (1) | | | | |
| 23 | | | | Media Flag | | | | |
| 24 | | | | Parameter Code (5) | | | | |
| 25 | | | | | | | | |
| 26 | DU(0) | DS(1) | TSD(0) | ETC(0) | TMC(0) | | Res(0) | LP(0) |
| 27 | | | | Parameter Length (1) | | | | |
| 28 | | | | Read Failure Flag | | | | |
| 29 | | | | Parameter Code (6) | | | | |
| 30 | | | | | | | | |
| 31 | DU(0) | DS(1) | TSD(0) | ETC(0) | TMC(0) | | Res(0) | LP(0) |
| 32 | | | | Parameter Length (1) | | | | |
| | | | | Write Failure Flag | | | | |
| 33 | | | | Parameter Code (7) | | | | |
| 35 | | | | | | | | |
| 36 | DU(0) | DS(1) | TSD(0) | ETC(0) | TMC(0) | | Res(0) | LP(0) |
| 37 | | | | Parameter Length (1) | | | | |
| 38 | | | | Media Life Flag | | | | |
| 39 | | | | Parameter Code (8) | | | | |
| 40 | | | | | | | | |
| 41 | DU(0) | DS(1) | TSD(0) | ETC(0) | TMC(0) | | Res(0) | LP(0) |
| 42 | | | | Parameter Length (1) | | | | |
| 43 | | | | Not Data Grade Flag | | | | |
| 44 | | | | Parameter Code (9) | | | | |
| 45 | | | | | | | | |
| 46 | DU(0) | DS(1) | TSD(0) | ETC(0) | TMC(0) | | Res(0) | LP(0) |
| 47 | | | | Parameter Length (1) | | | | |
| 48 | | | | Write Protect Flag | | | | |
| 49 | | | | Parameter Code (0xA) | | | | |
| 50 | | | | | | | | |
| 51 | DU(0) | DS(1) | TSD(0) | ETC(0) | TMC(0) | | Res(0) | LP(0) |
| 52 | | | | Parameter Length (1) | | | | |
| 53 | | | | No Removal Flag | | | | |
| 54 | | | | Parameter Code (0xB) | | | | |
| 55 | | | | | | | | |
| 56 | DU(0) | DS(1) | TSD(0) | ETC(0) | TMC(0) | | Res(0) | LP(0) |
| 57 | | | | Parameter Length (1) | | | | |
| 58 | | | | Cleaning Media Flag | | | | |
| 59 | | | | Parameter Code (0xC) | | | | |
| 60 | | | | | | | | |
| 61 | DU(0) | DS(1) | TSD(0) | ETC(0) | TMC(0) | | Res(0) | LP(0) |
| 62 | | | | Parameter Length (1) | | | | |
| 63 | | | | Unsupported Format Flag | | | | |
| 64 | | | | Parameter Code (0xD) | | | | |
| 65 | | | | | | | | |
| 66 | DU(0) | DS(1) | TSD(0) | ETC(0) | TMC(0) | | Res(0) | LP(0) |
| 67 | | | | Parameter Length (1) | | | | |
| 68 | | | | Tape Snapped Flag | | | | |
| ... | | | | Parameter Code (xx) | | | | |
| ... | DU(0) | DS(1) | TSD(0) | ETC(0) | TMC(0) | | Res(0) | LP(0) |
| ... | | | | Parameter Length (1) | | | | |
| ... | | | | xxxxxxxxxxxxxx | | | | |
| 99 | | | | Parameter Code (0x14) | | | | |
| 100 | | | | | | | | |
| 101 | DU(0) | DS(1) | TSD(0) | ETC(0) | TMC(0) | | Res(0) | LP(0) |
| 102 | | | | Parameter Length (1) | | | | |
| 103 | | | | Clean Now Flag | | | | |
| 104 | | | | Parameter Code (0x15) | | | | |
| 105 | | | | | | | | |
| 106 | DU(0) | DS(1) | TSD(0) | ETC(0) | TMC(0) | | Res(0) | LP(0) |
| 107 | | | | Parameter Length (1) | | | | |
| 108 | | | | Clean Periodic Flag | | | | |
| 109 | | | | Parameter Code (16) | | | | |
| 110 | | | | | | | | |
| 111 | DU(0) | DS(1) | TSD(0) | ETC(0) | TMC(0) | | Res(0) | LP(0) |
| 112 | | | | Parameter Length (1) | | | | |
| 113 | | | | Expired Cleaning Media Flag | | | | |
| ... | | | | Parameter Code (xx) | | | | |
| ... | DU(0) | DS(1) | TSD(0) | ETC(0) | TMC(0) | | Res(0) | LP(0) |
| ... | | | | Parameter Length (1) | | | | |
| ... | | | | xxxxxxxxxxxxxx | | | | |
| 149 | | | | Parameter Code (1E) | | | | |
| 150 | | | | | | | | |
| 151 | DU(0) | DS(1) | TSD(0) | ETC(0) | TMC(0) | | Res(0) | LP(0) |
| 152 | | | | Parameter Length (1) | | | | |
| 153 | | | | Hardware A Flag | | | | |
| 154 | | | | Parameter Code (1F) | | | | |
| 155 | | | | | | | | |
| 156 | DU(0) | DS(1) | TSD(0) | ETC(0) | TMC(0) | | Res(0) | LP(0) |
| 157 | | | | Parameter Length (1) | | | | |
| 158 | | | | Hardware B Flag | | | | |
| 159 | | | | Parameter Code (20) | | | | |
| 160 | | | | | | | | |
| 161 | DU(0) | DS(1) | TSD(0) | ETC(0) | TMC(0) | | Res(0) | LP(0) |
| 162 | | | | Parameter Length (1) | | | | |
| 163 | | | | Interface Flag | | | | |
| 164 | | | | Parameter Code (21) | | | | |
| 165 | | | | | | | | |
| 166 | DU(0) | DS(1) | TSD(0) | ETC(0) | TMC(0) | | Res(0) | LP(0) |
| 167 | | | | Parameter Length (1) | | | | |
| 168 | | | | Eject Media Flag | | | | |
| 169 | | | | Parameter Code (21) | | | | |
| 170 | | | | | | | | |
| 171 | DU(0) | DS(1) | TSD(0) | ETC(0) | TMC(0) | | Res(0) | LP(0) |
| 172 | | | | Parameter Length (1) | | | | |
| 173 | | | | Download Fail Flag | | | | |
| ... | | | | Parameter Code (xx) | | | | |
| ... | DU(0) | DS(1) | TSD(0) | ETC(0) | TMC(0) | | Res(0) | LP(0) |
| ... | | | | Parameter Length (1) | | | | |

TABLE 2-continued

| | 7 | 6 | 5 | 4 | 3 | 2 | 1 | 0 |
|---|---|---|---|---|---|---|---|---|
| ... | | | | xxxxxxxxxxxxxx | | | | |
| 199 | | | | Parameter Code (0x28) | | | | |
| 200 | | | | | | | | |
| 201 | DU(0) | DS(1) | TSD(0) | ETC(0) | TMC(0) | | Res(0) | LP(0) |
| 202 | | | | Parameter Length (1) | | | | |
| 203 | | | | Loader Hardware A Flag | | | | |
| 204 | | | | Parameter Code (0x29) | | | | |
| 205 | | | | | | | | |
| 206 | DU(0) | DS(1) | TSD(0) | ETC(0) | TMC(0) | | Res(0) | LP(0) |
| 207 | | | | Parameter Length (1) | | | | |
| 208 | | | | Stray Tape Flag | | | | |
| 209 | | | | Parameter Code (0x2A) | | | | |
| 210 | | | | | | | | |
| 211 | DU(0) | DS(1) | TSD(0) | ETC(0) | TMC(0) | | Res(0) | LP(0) |
| 212 | | | | Parameter Length (1) | | | | |
| 213 | | | | Loader Hardware B Flag | | | | |
| 214 | | | | Parameter Code (0x2A) | | | | |
| 215 | | | | | | | | |
| 216 | DU(0) | DS(1) | TSD(0) | ETC(0) | TMC(0) | | Res(0) | LP(0) |
| 217 | | | | Parameter Length (1) | | | | |
| 218 | | | | Loader Door Flag | | | | |
| ... | | | | Parameter Code (xx) | | | | |
| ... | DU(0) | DS(1) | TSD(0) | ETC(0) | TMC(0) | | Res(0) | LP(0) |
| ... | | | | Parameter Length (1) | | | | |
| ... | | | | xxxxxxxxxxxxxx | | | | |
| 319 | | | | Parameter Code (40) | | | | |
| 320 | | | | | | | | |
| 321 | DU(0) | DS(1) | TSD(0) | ETC(0) | TMC(0) | | Res(0) | LP(0) |
| 322 | | | | Parameter Length (1) | | | | |
| 323 | | | | xxxxxxxxxxxxxx | | | | |

TABLE 3

| | 7 | 6 | 5 | 4 | 3 | 2 | 1 | 0 |
|---|---|---|---|---|---|---|---|---|
| 0 | | | | Page Code (0x1C) | | | | |
| 1 | | | | Page Length (0x0A) | | | | |
| 2 | Perf | | Reserved | | DExcpt | Test | Reserved | LogErr |
| 3 | | | Reserved | | | | MRIE | |
| 4 | | | | Interval Timer | | | | |
| 5 | | | | | | | | |
| 6 | | | | | | | | |
| 7 | | | | | | | | |
| 8 | | | | Report Count | | | | |
| 9 | | | | | | | | |
| 10 | | | | | | | | |
| 11 | | | | | | | | |

We claim:

1. A system for storing computer data comprising:
a storage device having means for reading data from and writing data to removable media, and for generating low level system status indications;
a controller including
first means for monitoring said low level system status indications and for providing low level error indicators in accord therewith;
second means for interpreting said low level indicators and for generating one or more corresponding high level error indicators; and
third means for prioritizing said high level indicators when more than one is present; and
means to communicate occurrence of said high level error indicators to enable provision of error messages to the user.

2. A system according to claim 1, wherein the third means categorizes the high level error indicators into three classes according to severity.

3. A system according to claim 1, wherein, if there are a plurality of error conditions occurring at the same time, said third means enables said error messages to be ordered according to the relative severity of the pertaining error indicators.

4. A system according to claim 1, wherein said third means groups the low-level error indicators into functional types and enables the high level error indicators to be communicated according to what functional type of low-level error has occurred.

5. A system according to claim 1, further comprising means for automatically initiating a predetermined sequence of error recovery steps according to the high level error indicators.

6. A system according to claim 1, which is configured so that the occurrence of high level error indicators is communicated at predetermined points in a storage operation.

7. A system according to claim 1 which is configured so that the occurrence of high level error indicators is communicated whenever a new error is indicated by the storage device.

8. A system according to claim 1, wherein the storage device is a tape drive.

9. A method for storing computer data comprising the steps of:
reading data from and/or writing data to removable media, and generating low level system status indications;
monitoring said low level system status indications and providing low level error indicators in accord therewith;
interpreting said low level indicators and generating one or more corresponding high level error indicators; and
prioritizing said high level indicators according to severity; and
triggering error messages to a user of the system on the basis of the occurrence of said high level error indicators.

10. A computer usable medium having computer readable program code means embodied in said medium executable by a host computer to perform in accordance with the method recited in claim 9.

11. The method as recited in claim 9 wherein at least some low-level error indicators result in a combination of high-level error indicators to be generated.

* * * * *